(12) United States Patent
Wechgeln et al.

(10) Patent No.: US 7,505,177 B2
(45) Date of Patent: Mar. 17, 2009

(54) METHOD FOR GENERATING A THRESHOLD VALUE MATRIX FOR FREQUENCY MODULATED HALF-TONING

(75) Inventors: Jörg Olaf Von Wechgeln, Wattenbek (DE); Michael Hansen, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 637 days.

(21) Appl. No.: 11/289,145

(22) Filed: Nov. 29, 2005

(65) Prior Publication Data

US 2006/0114512 A1  Jun. 1, 2006

(30) Foreign Application Priority Data

Nov. 29, 2004  (DE) .................. 10 2004 057 461

(51) Int. Cl.
  *H04N 1/405* (2006.01)
(52) U.S. Cl. .................... 358/3.13; 358/3.22
(58) Field of Classification Search .......... 358/1.9, 358/3.06, 3.13, 3.14, 3.16, 3.21, 3.22, 466, 358/534–536; 382/270
  See application file for complete search history.

(56) References Cited

U.S. PATENT DOCUMENTS

| | | | |
|---|---|---|---|
| 5,111,310 A | 5/1992 | Parker et al. | |
| 5,579,457 A | 11/1996 | Hall | |
| 5,685,652 A * | 11/1997 | Asai | 400/120.07 |
| 2006/0152767 A1* | 7/2006 | Asai et al. | 358/3.23 |
| 2006/0221399 A1* | 10/2006 | Hansen et al. | 358/3.06 |

* cited by examiner

*Primary Examiner*—Scott A Rogers
(74) *Attorney, Agent, or Firm*—Laurence A Greenberg; Werner H Stemer; Ralph E Locher

(57) ABSTRACT

A method for generating a threshold value matrix is used in the frequency-modulated half-toning of the image data to be reproduced. A threshold value matrix for a basic screen is generated in that low-pass filters of different width are applied to the bit patterns generated and the threshold value distribution is changed on the basis of the filtered results. Furthermore, the bit patterns generated are examined for specific part patterns and the threshold value distribution is changed in such a way that undesired part patterns no longer occur and, instead, desired part patterns, preferably rounded forms, are contained in the bit patterns generated. By use of a combination of scaling and/or rotation and/or mirroring of the threshold value matrix of the basic screen, threshold value matrices are generated for the printing inks.

9 Claims, 12 Drawing Sheets

FIG. 17 A 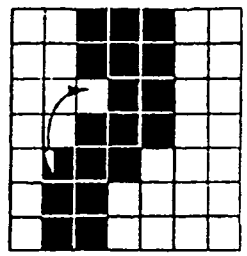 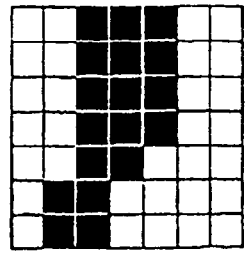 FIG. 17 B

METHOD FOR GENERATING A THRESHOLD VALUE MATRIX FOR FREQUENCY MODULATED HALF-TONING

BACKGROUND OF THE INVENTION

1. Field of the Invention

The invention pertains to the field of half-toning image data in electronic reproduction technology and relates to a method for generating a threshold value matrix which is used in the frequency-modulated half-toning of the image data to be reproduced. The image data describes the content of a printed page or of a printed sheet on which a plurality of printed pages are combined. The printed pages contain images, texts and graphic elements, whose image data has previously been assembled in an electronic system for the creation and processing of printed pages in accordance with a layout.

In multicolor printing, the image data to be reproduced is generally printed in the four printing inks cyan, magenta, yellow and black (CMYK). The originals of the images are scanned optoelectronically, point by point and line by line, for example in a color scanner, in order to obtain for each scanned image point the color components red, green and blue (RGB) as color values. The color values of a scanned colored image are then converted by a color correction calculation into the color separation values for the color separations cyan, magenta, yellow and black. Following the conversion, for each image point four color separation values (CMYK) are available as tonal values in the value range from 0 to 100%. The color separation values are a measure of the ink densities with which the four printing inks cyan, magenta, yellow and black are printed on the printing material. In special cases, in which printing is carried out with more than four printing inks (decorative inks), each image point is identified by as many color separation values as there are printing inks. The color separation values can be encoded digitally, for example with 8 bits for each image point and printing ink, the value range from 0 to 100% being subdivided into 256 tonal value steps.

In addition to image data for colored images, during the electronic production of printed pages, image data for text and for graphic elements which, together with the images, are combined in accordance with the stipulations of a layout to form the image data for entire printed pages, is produced. The data from a plurality of printed pages is finally mounted to form the image data for a printed sheet. The printed sheet data is likewise provided as color separation values (CMYK) for output or intermediate storage.

Different tonal values of a color separation to be reproduced may be reproduced in the print only by an area modulation of the printing inks applied, that is to say by half-toning. Therefore, with the aid of the color separation values (CMYK), four half-toned color separations for the printing ink cyan, magenta, yellow and black are exposed in a color separation exposer, also called a recorder or imagesetter, point by point and line by line, on a recording material. The recording material can be a lithographic film, with which printing plates are subsequently produced in a recopying method, or the printing plates are exposed directly in the exposer. The printing plate exposer can also be integrated into a press. The half-toned color separations are used as printing forms for the multicolor printing. In the press, the overprinting of the differently inked half-toned printing forms is then carried out to form a multicolor reproduction. There are also digital presses which print the half-toned color separation data directly onto the printing material without the use of a printing plate, for example with an electrophotographic or inkjet printing process.

For the area modulation of the printing inks, methods for dot half-toning are known in which different tonal values of the color separation data are converted into half-tone dots of proportional size. The half-tone dots are disposed in half-tone cells, into which the area of the image data is subdivided regularly in two orthogonal directions. The half-tone cells are very small, for example there are square half-tone cells with a side length (screen width) of $\frac{1}{60}$ cm, so that the printed half-tone dots are integrated again by the eye when viewing the final printed product, to form continuous tonal values. As a result of the overprinting of the periodically arranged half-tone dots, disruptive Moiré structures can occur in the print. In order to minimize such structures, the dot matrices of the four printing inks are arranged at different screen angles, for example at the screen angles 0, 15, 45 and 75 degrees.

In the known methods for dot half-toning, the half-tone dot in a half-tone cell is generally produced by a threshold value matrix. The recording area is resolved into the exposure points which are an order of magnitude smaller than the half-tone dots. The threshold value matrix contains the area of one or more half-tone dot cells and contains a threshold value for each exposure point within this area. During the recording of the color separations, the half-tone dots in the individual half-tone cells are assembled from exposure points. The decision as to whether an exposure point, as part of a half-tone dot within a half-tone cell, is to be exposed or not is made by comparing the tonal values of the color separation data with the threshold values of the threshold value matrix at the location of the respective exposure point, by which the tonal values are converted into high-resolution binary values having only two lightness values (exposed or not exposed), which form the pattern of the modulated dot matrix.

By using the known dot matrix methods, half-tone systems with any desired screen widths and screen angles and very good reproduction quality can be produced. However, in practice it has proven to be difficult to find screen systems for all possible applications which exhibit no Moiré. Such particular applications are given when more than four printing inks are to be overprinted or when the dot matrix with the fine patterns of the image content, for example a textile pattern, produces disruptive Moiré structures.

As an alternative to the dot matrix method, which is also designated amplitude-modulated half-toning, the area modulation of the printing inks can also be carried out in accordance with frequency-modulated half-toning (noise half-toning; stochastic half-toning), in which the tonal values of the color separation data are reproduced by an arrangement of small printed dots, generally of the same size, which are distributed in the recording area randomly but also as uniformly as possible. The number of printed dots per unit area determines the tonal value reproduced.

In many methods of frequency-modulated half-toning, the decision as to whether an exposure point is to be exposed or not is also brought about by comparing the tonal values of the image data to be reproduced with the threshold values of a threshold value matrix which contains a random distribution of the threshold values. For instance, the threshold value matrix is square and contains 256×256 threshold values. The threshold value matrix is repeated periodically horizontally and vertically, so that the entire recording area is covered without any gaps by threshold value matrices. Each exposure point in the recording area is also assigned a threshold value. During the half-toning, for each exposure point a tonal value of the color separation data is compared with the associated threshold value of the matrix. If the tonal value is greater than the threshold value, the exposure point is exposed; when the tonal value is less than or equal to the threshold value, the exposure point is not exposed. With the increase in the tonal value, the number of exposed points increases until, finally, for the maximum tonal value, the entire area covered by the threshold value matrix is exposed. In this way, for the entire printed page or the entire printed sheet, a random distribution of the exposed points is produced. On the basis of the random distribution of the exposed points, it is not possible for any Moiré to be produced by regular patterns of the image content. If a different distribution of the threshold values in the threshold value matrix is selected for each of the color separations CMYK, no Moiré structures are produced by the overprinting of the color separations either.

In order to produce a suitable distribution of the threshold values within the threshold value matrix, various methods are known. Here, the intention is to produce, first, a random distribution of the exposure points for all tonal values of the image data but, second, a distribution of the exposure points which does not contain any disruptive patterns and which appears uniform enough to the eye.

In U.S. Pat. No. 5,111,310, a method is described for producing a threshold value matrix whose threshold value distribution has the spectrum of blue noise, as it is known, that is to say the spectrum has no components at low frequencies below a limiting frequency. This has the effect that the threshold value distribution for all tonal values produces visually pleasant patterns for exposure points which do not act so unsteadily as a distribution with white noise. The distribution of the threshold value is constructed by an iterative method which, for each tonal value, transforms the pattern of the exposure points produced into a spectral representation, shapes the spectrum with a filter in accordance with the spectrum of the blue noise and then transforms it back into a modified exposure pattern. From the comparison between the modified exposure pattern and the original exposure pattern, a decision is made as to which threshold values of the threshold value matrix must be modified in order to come closer to the intended blue noise.

U.S. Pat. No. 5,579,457 discloses a method for producing a threshold value matrix in which the matrix is subdivided into subregions and, in each subregion, the threshold values are put into the matrix in accordance with a randomly placed spiral function. As a result, patterns of the exposure points which are arranged along randomly distributed spiral arms are produced. With increasing tonal value, further exposed points are added, which fill up the gaps in the spiral arms, that is to say the order in which the exposure pattern is supplemented by further exposed points with increasing tonal value is determined by the spiral functions. In this way, randomly distributed, rounded shapes are produced, which act uniformly and steadily on the eye.

The known methods of frequency modulated half-toning occasionally have a certain residual unsteadiness in the printed image, particularly in the average tonal values, which are felt to be disruptive. A further problem is that, in specific tonal value ranges, the exposure pattern produced contains too many exposure points which stand isolated, which can be exposed only poorly on the printing plate because of their small size and then cannot be transferred reliably to the printing material in the press.

SUMMARY OF THE INVENTION

It is accordingly an object of the invention to provide a method for generating a threshold value matrix for frequency-modulated half-toning that overcomes the above-mentioned disadvantages of the prior art methods of this general type.

With the foregoing and other objects in view there is provided, in accordance with the invention, a method for generating a threshold value matrix for a basic screen for frequency-modulated half-toning for generating a half-toned form of image data. The method includes varying the image data in a total value range between 0% and 100%; forming the threshold value matrix to contain MX×MY threshold values and being filled with the threshold values from 0 to (MX×MY−1); determining values of image points of the half-toned form by performing a comparison between tonal values of the image data and the threshold values of the threshold value matrix; placing black points alternately in a first binary data field having MX×MY binary points; placing white points in a second binary data field having MX×MY binary points; and determining first positions with at least two low-pass filters of different width applied to the first binary data field and to the second binary data field respectively. At the first positions or in an environment of the first positions, a search is performed for specific part patterns of the black or white points and second positions are determined there, at which the black and white points are respectively placed. At the second positions of the black points, the threshold values from 0 to ((MX×MY)/2−1) are entered in the threshold value matrix in ascending order and at the second positions of the white points, entering the threshold values from (MX×MY−1) to ((MX×MY)/2) in the threshold value matrix in descending order.

The method according to the invention achieves the object by a step-by-step improvement of a temporarily created threshold value distribution in a threshold value matrix, various low-pass filters being applied to the exposure pattern produced and the threshold value distribution being changed on the basis of the filtered results. Furthermore, the exposure patterns produced are examined with a number of bit pattern tests for desired and undesired part patterns. The threshold value distribution is then changed in such a way that the undesired part patterns no longer occur and, instead, desired part patterns, preferably rounded shapes, are contained in the exposure patterns of the tonal values that are produced. Furthermore, the threshold value distribution is also optimized in such a way that the number of exposure points standing isolated is minimized.

Other features which are considered as characteristic for the invention are set forth in the appended claims.

Although the invention is illustrated and described herein as embodied in a method for generating a threshold value matrix for frequency-modulated half-toning, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 17A-17B are illustrations showing an example of the elimination of isolated points;

DESCRIPTION OF THE PREFERRED EMBODIMENTS

Figure 1:
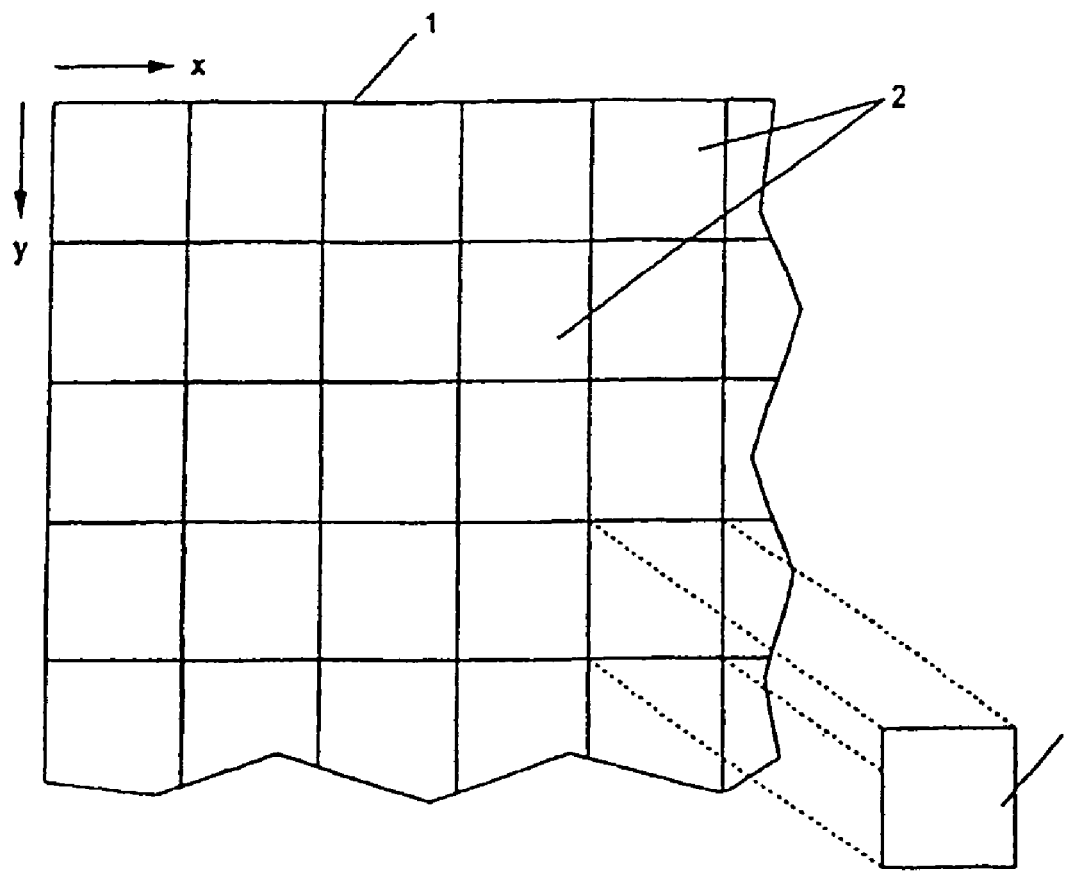
FIG. 1 is an illustration showing a division of the recording area into tiles.

In frequency-modulated half-toning, for which the method according to the invention for producing a threshold value matrix is to be used, the entire recording area is divided up into part fields of equal size, called tiles in the following text. FIG. 1 shows the recording area 1 and the tiles 2. Each exposure point on the recording area 1 is described uniquely by its location coordinates x and y. The tiles 2 are preferably all of the same size and rectangular or square. Tiles 2 shaped in other ways, with which the recording area 1 can be divided up into tiles without gaps, are also possible. In the example described here, assume that the tiles 2 have a size of 256×256 exposure points.

For further discussion, it will be assumed that the resolution of the color separation data is equal to the resolution of the exposure points in the recording area 1, that is to say that each exposure point is assigned one tonal value in the color separation data. The resolution of the exposure points is, for example, 1000 exposure points/cm. If the original resolution of the color separation data is lower, however, the tonal values can easily be converted to the resolution of the exposure points by a resolution adaptation method.

In order to carry out the half-toning, a threshold value matrix 3 having randomly distributed threshold values is provided, which has the same size and resolution as a tile 2. Each of the tiles 2 has the threshold value matrix 3 superimposed congruently on it, so that each exposure point from the tile 2 is assigned one threshold value from the threshold value matrix 3. By comparing the tonal value from the color separation data assigned to each exposure point with the associated threshold value, a decision is made as to whether the exposure point is to be exposed or not. For the case described here, the threshold value matrix 3 contains 256×256 threshold values which, for example, are quantized with 16 bits. Each of the possible threshold values in the range from 0 to 65535 is contained exactly once in the threshold value matrix. The tonal values of the image data are likewise resolved with 16 bits.

Figure 2:
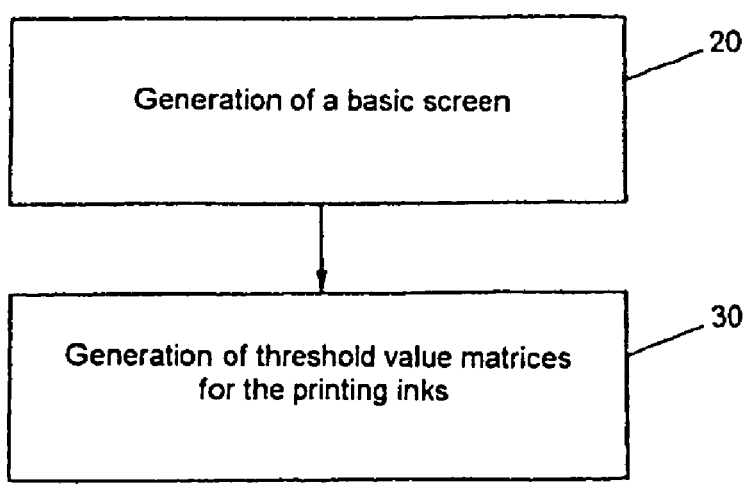
FIG. 2 is a flow chart showing working phases of the method according to the invention.

The method according to the invention can be subdivided into two working phases (FIG. 2). In a first phase 20, a basic screen with optimized characteristics is produced. In a second phase 30, a separate threshold value matrix is then generated from the basic screen for each of the printing inks CMYK. Both working phases are implemented by computer programs.

Figure 3:
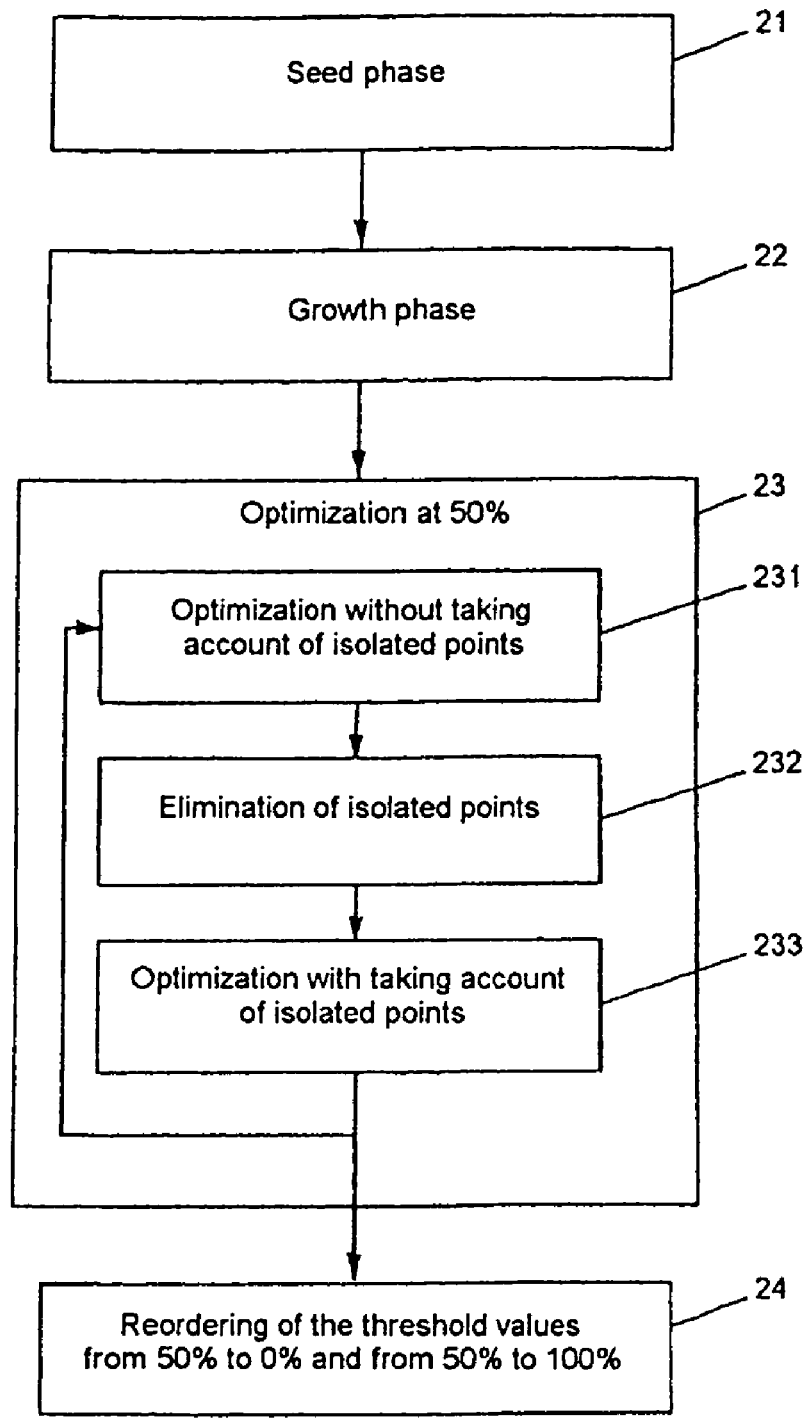
FIG. 3 is a flow chart showing the working steps for producing a basic screen.
Figure 4:
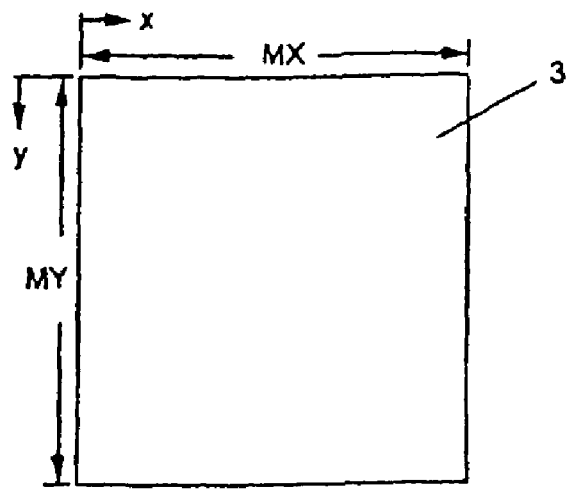
FIG. 4 is an illustration showing a threshold value matrix of the basic screen.
Figure 5:
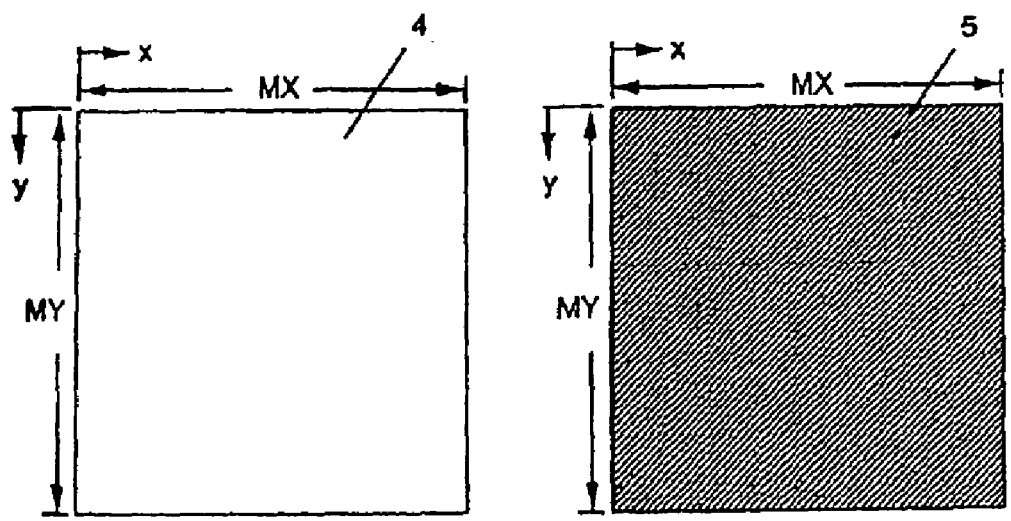
FIG. 5 is an illustration showing two binary data fields of the basic screen.

FIG. 3 shows the flow of the working steps for the first phase 20. By way of preparation, a two-dimensional data field for the threshold value matrix of the basic screen is created, which is formed of MX×MY threshold values, for example of 256×256 threshold values. FIG. 4 shows the threshold value matrix 3 of the basic screen. All the threshold value positions are pre-filled with the average (MX×MY)/2, which corresponds to the average tonal value with an area coverage of the screen over 50%. For the example of a threshold value matrix 3 containing 256×256 threshold values, the average value is equal to 32768. Furthermore, a binary data field 4 for the subsequent entry of black points and a binary data field 5 for the subsequent entry of white points are created (FIG. 5). Both the binary data fields have the same dimensions MX×MY as the threshold value matrix 3. The binary data field 4 for black points is pre-filled with the binary value 0, and the binary data field 5 for white points is pre-filled with the binary value 1. The binary value 0 identifies a white point and the binary value 1 identifies a black point in the screen to be produced for a tonal value. In the binary data field 4, the basic screen is built up beginning at 0% for increasing tonal values, and in the binary data field 5, the basic screen is built up beginning at 100% for decreasing tonal values. For the following explanations of the method according to the invention, it will be assumed that, during the half-toning of a tonal value, the decision for the exposure point is made in accordance with the relationship:

tonal value>threshold value=>black exposure point tonal value≦threshold value=>white exposure point (1).

The generation of the basic screen begins with the seed phase 21 (FIG. 3), in which what are known as seed points are entered into the binary data fields 4 and 5 and into the threshold value matrix 3. Black seed points are black points placed in the lighter region of the tonal value scale with an extent of 1, 2×2, or 3×3 exposure points. White seed points are correspondingly white points placed in the deeper region of the tonal value scale with an extent of 1, 2×2, or 3×3 exposure points. For the further explanation, it will be assumed that seed points of 2×2 exposure points will be used. First of all, in the binary data field 4, the first four black seed points are placed at the following positions:

$$x = 0.25*MX + xoffset \quad y = 0.25*MY + yoffset \quad (2)$$
$$x = 0.75*MX + xoffset \quad y = 0.75*MY + yoffset$$
$$x = 0.75*MX + xoffset \quad y = 0.25*MY + yoffset$$
$$x = 0.25*MX + xoffset \quad y = 0.75*MY + yoffset.$$

In order that no symmetrical structures result, the coordinates are changed by respectively different random offset values xoffset and yoffset, which can be positive or negative. Likewise, in the binary data field 5, the first four white seed points are placed at the following positions:

| | | |
|---|---|---|
| x = 0.5*MX + xoffset | y = 0.5*MY + yoffset | (3) |
| x = 0 + xoffset | y = 0 + yoffset | |
| x = 0 + xoffset | y = 0.5*MY + yoffset | |
| x = 0.5*MX + xoffset | y = 0 + yoffset | |

Figure 6:
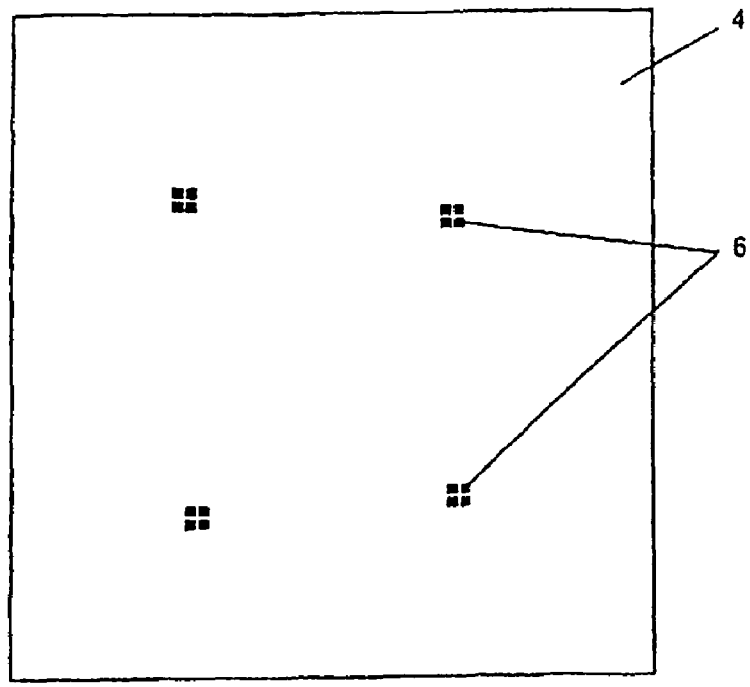
FIG. 6 is an illustration showing the binary data fields with first seed points.
Figure 6:
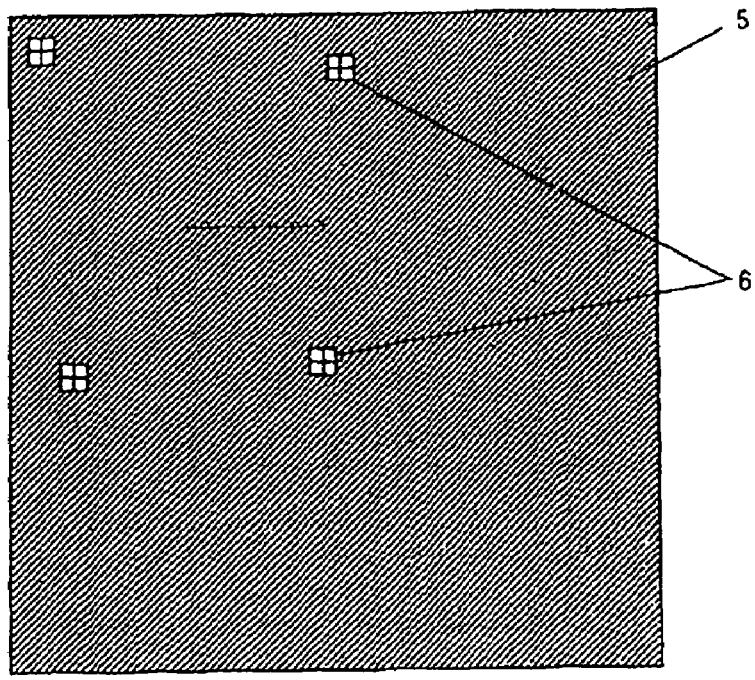

FIG. 6 shows the binary data fields 4 and 5 with the respective first four black and white seed points 6 which, for the purpose of clarification, are shown highly enlarged.

In the threshold value matrix 3, the threshold values 0, 1, 2, 3 are entered into the positions which are occupied by the first black seed point 6. The threshold values 4, 5, 6, 7 are entered into the positions of the second black seed point 6, the positions of the third black seed point 6 are filled with the threshold values 8, 9, 10, 11 and so on. For each successively placed black seed point 6, the corresponding positions in the threshold value matrix 3 are filled with the next four free threshold values in ascending order. For the first white seed point 6, the associated positions in the threshold value matrix 3 are filled with the threshold values 65535, 65534, 65533, 65532, for the second white seed point 6, with the threshold values 65531, 65530, 65529, 65528, and so on. For each successively placed white seed point 6, the corresponding positions in the threshold value matrix 3 are filled with the next four free threshold values in descending order. In general, the black exposure points of the binary data field 4 are assigned the available threshold values in an ascending order, beginning at 0, and the white exposure points of the binary data field 5 are assigned the available threshold values in descending order, beginning at (MX×MY−1). This applies both to the seed phase 21 and to the growth phase 22 explained later (FIG. 3).

Figure 7:
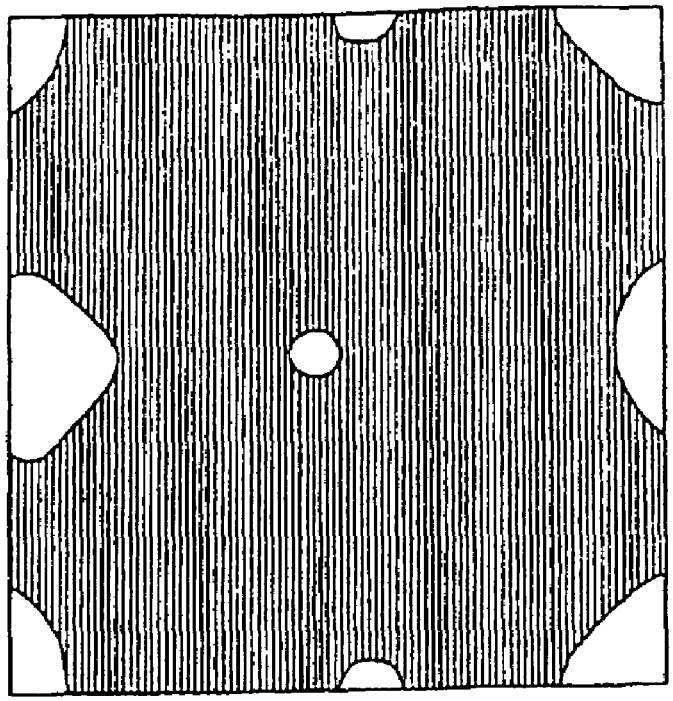
FIG. 7 is an illustration showing the filtered result of a wide low-pass filter.

After the first four black and the first four white seed points 6 have been placed in the manner described, a new black seed point 6 and a new white seed point 6 are respectively placed alternatively, and the associated positions in the threshold value matrix 3 are in each case filled with the next free threshold values ascending and descending, respectively. The position of the new seed points 6 to be placed depends on the result of two low-pass filtering operations in the respective binary data field 4 and 5. This will be explained by using the example of a new black seed point 6 to be placed. First of all, the binary data field 4 is subjected to first low-pass filtering with a two-dimensional wide filter core which, for example, contains 63×63 filter coefficients. In the filtered result, the points are determined whose filtered values belong to the smallest 12.5% of all the filtered values. FIG. 7 shows the result of this subdivision of the filtered values, the smallest 12.5% of the filtered values being illustrated as white regions and the remaining filtered values as a hatched region. The value of 12.5% for the threshold for determining the smallest filtered values is a preferred value. For this threshold, however, other values can also be chosen. The white regions identify the areas in the binary data field 4 which form the largest gaps between the black seed points already placed. The next seed point 6 is placed in one of these gaps. The exact position for this is determined by the gap regions determined by the first low-pass filtering being subjected to second low-pass filtering with a narrow filter core which, for example, contains 17×17 filter coefficients. The next black seed point 6 is placed at the point which has the smallest filtered result of the narrow low-pass filter.

Figure 8:
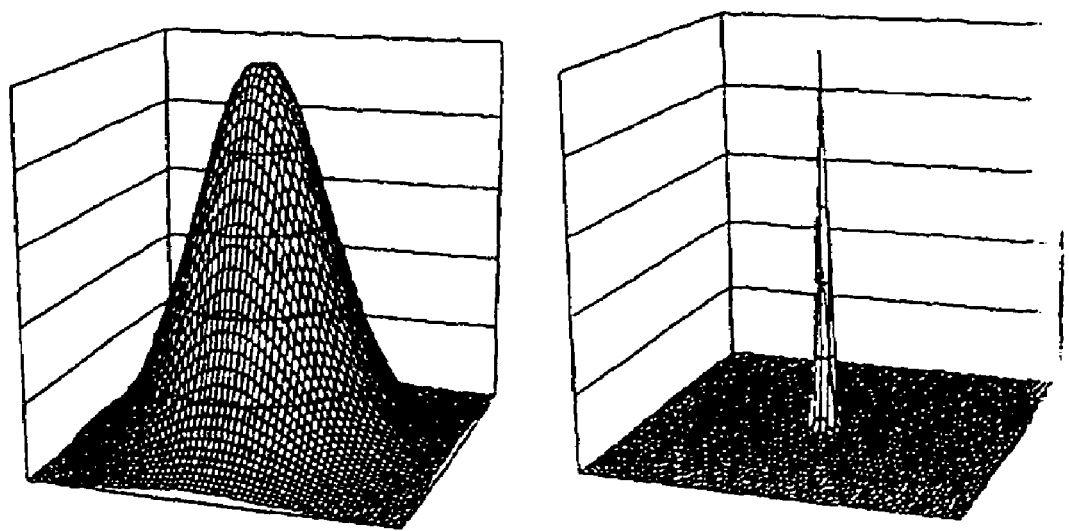
FIG. 8 is an illustration showing the filter functions of the wide and of the narrow low-pass filter.
Figure 9:
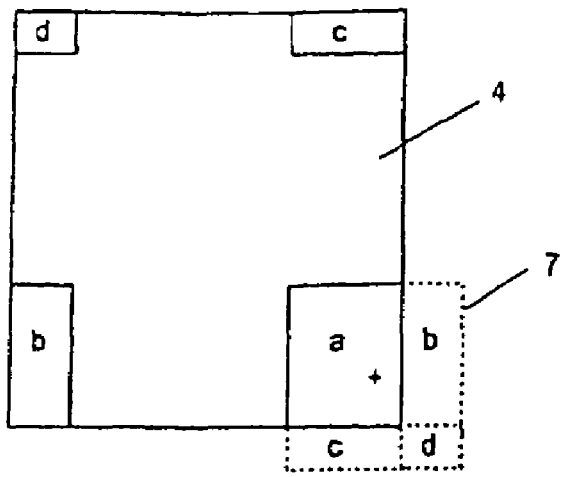
FIG. 9 is an illustration showing the folding over of a filter core.

The wide low-pass filter discovers asymmetries within the binary data field 4 which, in the case of large half-toned areas with the same tonal value, would be visible as periodic disturbances, with a period determined by the size of the threshold value matrix 3. The narrow low-pass filter detects the points in the binary data field 4 which would be sensed by the eye as local unsteadiness or as residual noise. Low-pass filters with a Gaussian course are preferably used. FIG. 8 shows the filter functions of the wide and of the narrow low-pass filter in comparison. The width of the two filters is additionally varied on the basis of the area coverage achieved by the points already placed in the binary data field 4. In the case of a low area coverage, wider filter functions are chosen, for example 175×175 for the wide filter and 55×55 for the narrow filter. With increasing area coverage, narrower filter functions are chosen for both filters but the width ratio between the wide and the narrow filter is approximately maintained. During the application of the filters, care is taken that the threshold value matrix 3 is subsequently continued periodically in all directions when half-toning the color separation data in the recording area 1. If parts of the filter core lie outside the binary data field, they are therefore "folded over" onto the opposite side or onto the opposite corner of the binary data field. FIG. 9 illustrates this by using an example in which the center of the filter call 7 lies in the vicinity of the bottom right corner of the binary data field 4 and the parts b, c, d of the filter core 7 are folded over. This folding over is applied not only to the filter operation but also to all other operations which are to be explained later in which a specific environment around a point or a bit pattern and so on is tested or processed. As soon as parts of the environment or the bit pattern lie outside the data fields or outside the threshold value matrix 3, they are folded over onto the opposite side.

In the course of the seed phase 21, in each case alternately, a new black seed point 6 is placed in the binary data field 4 and, a new white seed point 6 is placed in the binary data field 5, and the associated positions in the threshold value matrix 3 are in each case filled with the next free threshold values ascending and descending, respectively. The position of a new white seed point 6 is likewise determined in the manner described by a wide and a narrow low-pass filter, which are both applied to the binary data field 5. In the filtered result from the wide filter, the points whose filtered values belong to the largest 12.5% of all the filtered values are determined. The regions identified in this way form the gaps between the white seed points 6 already placed. In these gap regions, using the narrow filter, a search is made for the point with the largest filtered result, at whose position the next white seed point 6 is placed.

During the seed phase 21, specific conditions still have to be observed when placing the black and white seed points 6. A new seed point 6 may be placed only where
(a) it does not overlap an existing black or white seed point, and
(b) it maintains a minimum spacing from the seed points of the same color.

The minimum spacing is selected in advance and kept constant for the duration of the processing. It can amount to 0, 1, 2 or 3 exposure points. Black seed points 6 may touch white seed points 6 but not overlap. With the definition of the size and the spacing of the seed points 6, the width of the structures which are formed in the basic screen for the 50% area coverage can be influenced. At the intended position which is determined by the low-pass filter, the conditions for placing a seed point 6 are checked. The more seed points 6 there are, the more difficult it becomes to satisfy the conditions exactly at the intended position. If the conditions cannot be satisfied at the intended position, a search is made in a small environment around the intended position, for example in an environment of up to 9×9 exposure points, for a position in which the conditions for placing the new seed point 6 are satisfied. If such a position is not found, a start is made on adding individual points, for example of the size of only one exposure point, to existing seed points 6, so that the existing seed point becomes larger. The transition to the growth phase 22 therefore takes place (FIG. 3). With the previously defined minimum spacing, it is possible to control when the growth phase 22 begins with increasing occupancy of the binary data fields 4 and 5. A check is always made first to see whether a seed point 6 can be placed at the intended position or in its environment, before an individual point is added to an existing structure. At some intended positions, it is still possible for seed points 6 to be placed, while at other intended positions, individual points already have to be added. The transition from the seed phase 21 to the growth phase 22 therefore takes place smoothly.

Figure 10:
FIGS. 10A-10B are illustrations showing the neighborhood conditions of first priority.
Figure 10:
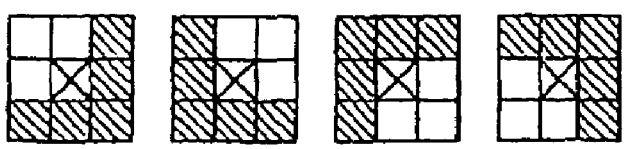

During the growth phase, the direct neighboring points around the intended position are tested for the presence of specific bit patterns which, in the following text, are also designated neighborhood conditions. If the neighborhood conditions cannot be satisfied at the intended position, they are tested in a search environment around the intended position. For the testing of the neighborhood conditions, there are specific groups of bit patterns which are graded in accordance with priorities. FIG. 10A shows the bit patterns of first priority for a black growth point, and FIG. 10B shows the bit patterns of first priority for a white growth point. The point at the position to be tested for a growth point is identified by a cross (X). This point must still be free in the binary data fields and in the threshold value matrix 3. Neighboring points which have already been placed in the binary data field 4 are identified black in FIG. 10A. Neighboring points which have already been placed in the binary data field 5 are identified white in FIG. 10B. Points which are of no interest during the neighborhood testing are hatched. If one of the four bit patterns of FIG. 10A is present at the position to be tested for a black growth point, the growth point is placed in the binary data field 4, and the corresponding position in the threshold value matrix 3 is filled with the next free threshold value in ascending order.

If one of the four bit patterns of FIG. 10B is present at the position to be tested for a white growth point, the growth point is placed in the binary data field 5, and the corresponding position in the threshold value matrix 3 is filled with the next free threshold value in descending order.

Figure 11:
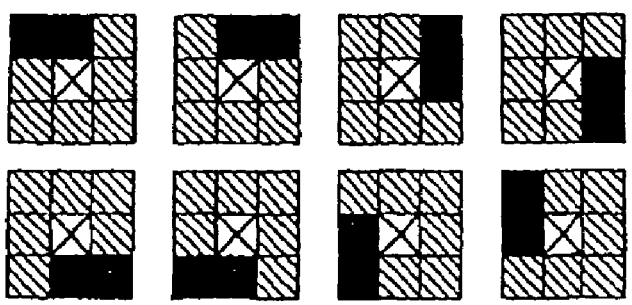
FIGS. 11A-11B are illustrations showing the neighborhood conditions of second priority.
Figure 11:
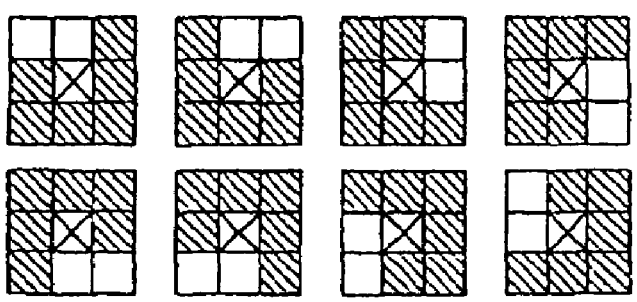

If none of the bit patterns of first priority is present, a test is made to see whether one of the bit patterns of second priority is present. FIG. 11A shows the bit patterns of second priority for a black growth point, and FIG. 11B shows the bit patterns of second priority for a white growth point. If one of the bit patterns of FIG. 11 is present at the position to be tested for a black or white growth point, the growth point is placed in the binary data field 4 or 5, and the corresponding position in the threshold value matrix 3 is filled with the next free threshold value in ascending or descending order, respectively.

Figure 12:
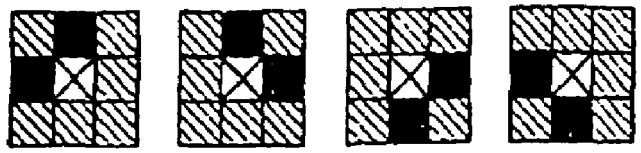
FIGS. 12A-12B are illustrations showing the neighborhood conditions of third priority.
Figure 12:
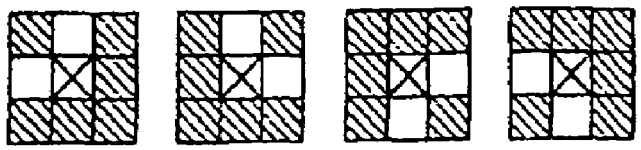

If none of the bit patterns of second priority is present, a test is made to see whether one of the bit patterns of third priority is present. FIG. 12A shows the bit patterns of third priority for a black growth point, and FIG. 12B shows the bit patterns of third priority for a white growth point. If one of the bit patterns of FIG. 12 is present at the position to be tested for a black or white growth point, the growth point is placed in the binary data field 4 or 5, and the corresponding position in the threshold value matrix 3 is filled with the next free threshold value in ascending or descending order, respectively.

Figure 13:
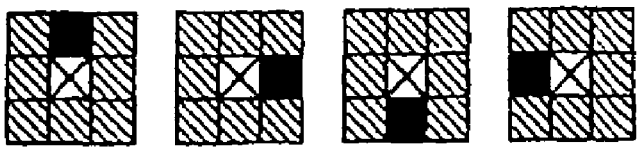
FIGS. 13A-13B are illustrations showing the neighborhood conditions of fourth priority.
Figure 13:
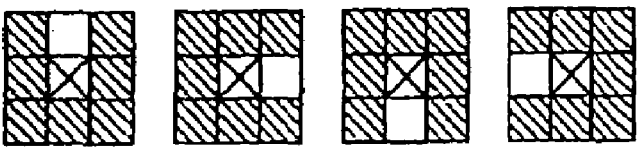

If none of the bit patterns of third priority is present, a test is made to see whether one of the bit patterns of fourth priority is present. FIG. 13A shows the bit patterns of fourth priority for a black growth point, and FIG. 13B shows the bit patterns of fourth priority for a white growth point. If one of the bit patterns of FIGS. 13A-13B is present at the position to be tested for a black or white growth point, the growth point is placed in the binary data field 4 or 5, and the corresponding position in the threshold value matrix 3 is filled with the next free threshold value in ascending or descending order, respectively.

Figure 14:
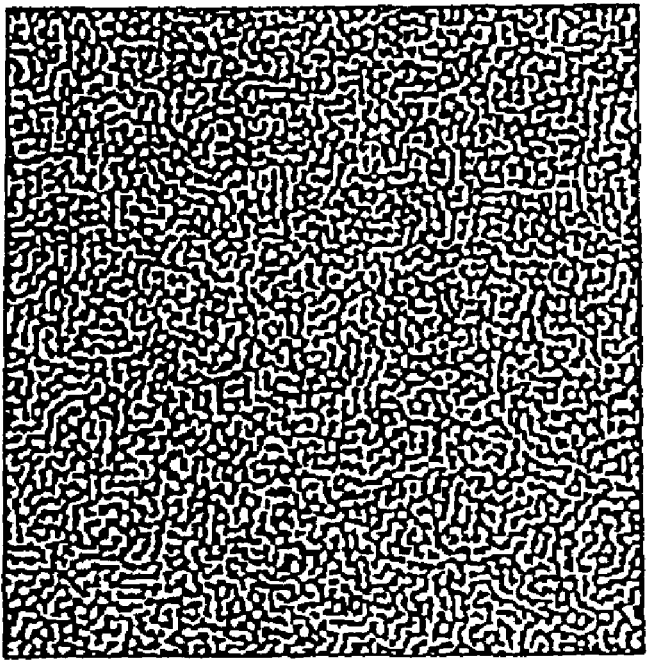
FIG. 14 is an illustration showing the result of the growth phase.

As explained, the testing of the neighborhood conditions in the order of the priorities is first carried out at the intended position for a growth point, the intended position in each case being determined by the wide and the narrow low-pass filter. If none of the conditions is satisfied there, then the search in the environment of the intended position is widened and the search environment is enlarged until one of the neighborhood conditions is satisfied. The placing of growth points at locations with the preferred configurations of the neighboring points primarily has the effect that gaps between individual points are filled. The growth phase 22 is continued alternatively for black and for white growth points until the growth of the black points in the binary data field 4 and the growth of the white points in the binary data field 5 meet at the 50% area coverage and, in the threshold value matrix 3, all the positions are occupied by one of the available threshold values from 0 to (MX×MY−1). FIG. 14 shows an example of the result at the 50% area coverage, that is to say if the threshold value matrix 3 created at the end of the growth phase 22 is used for half-toning a tonal value of 50%.

However, at the end of the growth phase 22, the bit pattern at 50% area coverage has many corners and points which, overall, still permit it to appear unsteady. Therefore, the growth phase 22 is followed by an optimization phase 23, with which the corners and points of the bit pattern at 50% area coverage are replaced by rounder shapes and isolated points are eliminated. The optimization phase contains three of the working steps 231, 232, 233 (FIG. 3), which can also be passed through cyclically many times.

In the first working step 231 of the optimization 23, the bit pattern at 50% area coverage, which is contained identically in the binary data fields 4 and 5 at the end of the growth phase 22, is changed in such a way that diagonal and round structures are preferably produced. In the process, initially no account is taken of whether the interchanges produce new isolated points. In the following text, a point which stands in isolation in an area of the other color or projects into such an area as a point or corner will be designated an isolated point. The basic operation during the optimization is the interchanging of a black point and a white point in each case. The positions of the points to be interchanged are determined with two low-pass filters of different widths, as in the seed phase 21 and in the growth phase 22. The filtering operations are carried out on a binary data field which contains the bit pattern at 50% area coverage. Using the low-pass filters, a first position is sought at which the narrow low-pass filter has a minimum filtered result, and a second position at which the narrow low-pass filter has a maximum filtered result. In this case, the search area of the narrow low-pass filter is restricted in the same way by the filtered results of the wide low-pass filter as has already been explained for the seed phase 21 and the growth phase 22. At the two positions, in each case the neighboring points are checked for specific local patterns and only if one of these patterns is present at the two positions are the points interchanged. To this end, a black point is placed at the first position in the binary data field and a white point is placed at the second position. In the threshold value matrix 3, the threshold values of the first and of the second position are interchanged.

Figure 15:
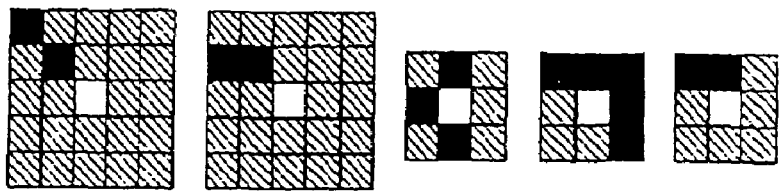
FIGS. 15A-15B are illustrations showing the patterns for the first working step of the optimization phase.
Figure 15:
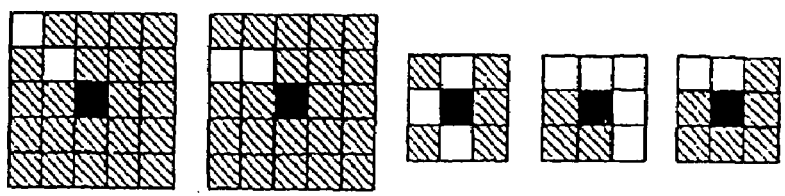

FIG. 15A shows the local patterns for the first position, and FIG. 15B shows the corresponding patterns for the second position. The patterns are shown in FIG. 15 only for one orientation. The corresponding patterns in the other orientations are likewise checked. Points which are of no interest in the neighborhood testing are hatched. The points to be interchanged are located at the center of the patterns. The fact that the interchanging is carried out only in the presence of these patterns means that diagonal and round structures are preferably produced. Following each interchange of two points, the result is checked by renewed low-pass filtering. If the difference between the minimum and the maximum filtered result has not become smaller, the interchange is reversed and the algorithm is continued with low-pass filters of changed width. Changing the filter width ensures that other first and second positions are subsequently found. The interchange of black and white points is continued until a defined number of interchanges, for example 50 interchanges, have had to be performed one after another.

Figure 16:
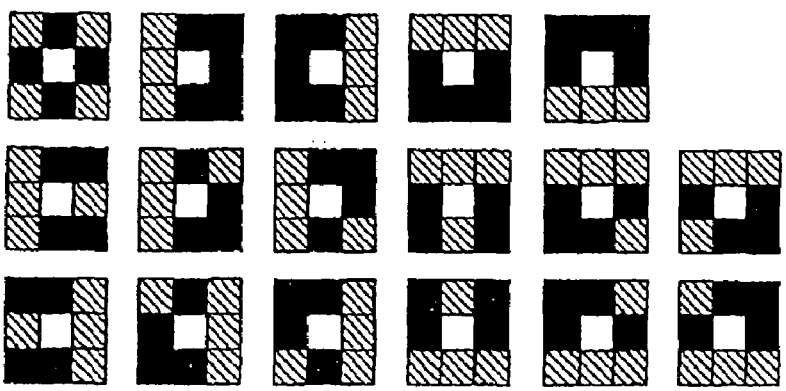
FIGS. 16A-16B are illustrations showing the patterns for the second working step of the optimization phase.
Figure 16:
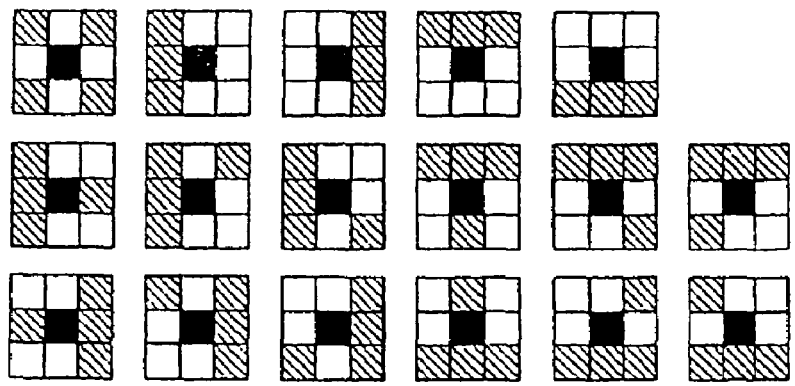

In the second working step 232 of the optimization 23, isolated points which have been produced by the interchanges are eliminated. To this end, all the positions of the binary data field are checked for specific patterns of the neighboring points which define an isolated point. FIG. 16A shows these patterns for a white point and the position to be examined, and FIG. 16B shows the corresponding patterns for a black point. Each point of the binary data field is compared with the patterns of FIG. 16. If an isolated point is found, it is interchanged with an isolated point of the other color. In order that the distribution of the points optimized by the low-pass filtering is not excessively impaired, care is taken in the process that the points to the interchanged are not far removed from each other. In order to comply with this distance condition, an isolated point can also be interchanged with a close non-isolated point of the other color. In parallel with the interchange in the binary data field, in turn the threshold values in the threshold value matrix 3 are interchanged at the corresponding positions. FIGS. 17A-17B show an example of the elimination of isolated points, FIG. 17A showing the arrangement before the interchange and FIG. 17B the arrangement after the interchange.

Figure 18:
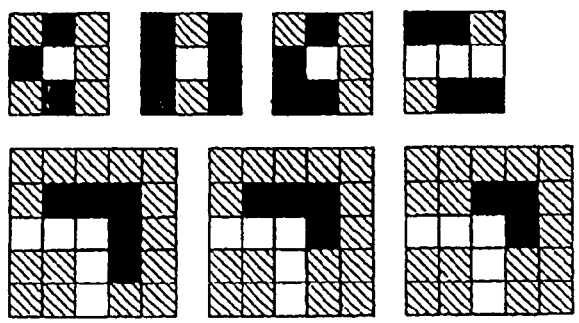
FIGS. 18A-18B are illustrations showing the patterns for the third working step of the optimization phase.
Figure 18:
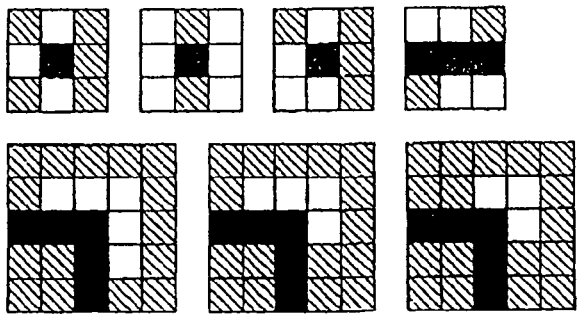

In the third working step 233 of the optimization 23, the bit pattern at 50% area coverage is again optimized as in the first working step 231, the local patterns at which points are interchanged being selected somewhat differently, however, in order that no new isolated points are produced during this optimization step. FIG. 18A shows the local patterns used in this case for the first position found by the low-pass filters, and FIG. 18B shows the corresponding patterns for the second position. The patterns are shown in FIG. 18 for only one orientation. The corresponding patterns in the other orientations are likewise tested. Points which are of no interest during the neighborhood testing are hatched. The points to be interchanged are located at the center of the patterns. As in working step 231, the result is checked by renewed low-pass filtering after each interchange of two points. If the difference between the minimum and the maximum filtered result has not become smaller, the interchange is reversed and the algorithm is continued with low-pass filters of changed width. The interchange of black and white points is continued until a defined number of interchanges, for example 50 interchanges, have had to be performed one after another.

Figure 19:
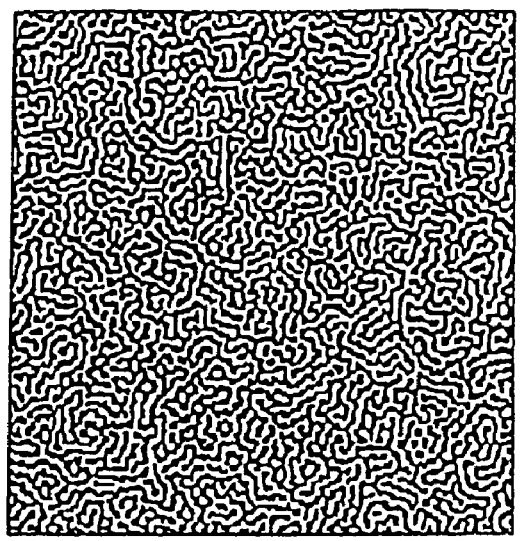
FIG. 19 is an illustration showing the result of the optimization phase.

The working steps 231, 232, 233 of the optimization phase 23 can also be repeated cyclically many times in order to improve the result further. FIG. 19 shows the result of the optimization 23 and 50% area coverage, that is to say if the optimized threshold value matrix 3 is used for half-toning a tonal value of 50%. As compared with FIG. 14, structures which are considerably rounder and more pleasant for the eye have been produced.

As a result of the interchanging of black and white points in the bit pattern at 50% area coverage and the corresponding interchanging of the threshold values in the threshold value matrix 3, although the structures of the 50% bit pattern have been optimized, the bit patterns produced during the seed phase 21 and the growth phase 22 for the tonal value ranges from 0% to 50% and from 50% to 100% have been changed so highly that they are no longer optimal. Therefore, in a subsequent working step 24 (FIG. 3), the threshold values for these tonal value ranges are redefined, but care has been taken that the optimized bit pattern at 50% area coverage is maintained. This will be explained below for the tonal value range from 50% to 0%. In this case, the starting point will be the binary data field which contains the optimized bit pattern at 50% area coverage (FIG. 19). The positions of the black points in the threshold value matrix 3 contain the threshold values from 0 to (MX×MY/2−1), and the positions of the white points in the threshold value matrix 3 contain the threshold values from (MX×MY/2) to (MX×MY−1). For the tonal value range from 50% to 0%, the threshold values are reassigned in descending order, therefore beginning at 32767 for a threshold value matrix having 256×256 threshold values and descending to 0.

Figure 20:
FIGS. 20A-20B are illustrations showing the neighborhood conditions for the reordering of the threshold values from 50% to 0% and from 50% to 100%.
Figure 20:

Using a wide and a narrow low-pass filter, a search is made in the binary data field for the position with the maximum filtered result. At the position found, there must be a black point in the binary data field, and once more specific neighborhood conditions must be provided, which are shown in FIG. 20A. The neighborhood conditions are shown for only one orientation; they are likewise tested for the other orientations. The hatched neighboring points are not examined. If none of the neighborhood conditions is satisfied at the position having the maximum filtered result, a search is made in the environment of this position for a suitable arrangement of points. The first four neighborhood conditions are preferably tested, that is to say only if none of the conditions can be satisfied in the environment are the two last neighborhood conditions tested. If one of the neighborhood conditions is found, the position in the binary data field is set to white. In the threshold value matrix 3, the threshold value previously found at the corresponding position is interchanged with the threshold value currently to be placed. For instance, if the threshold value currently to be placed is 32767 and the previously found threshold value is 17344, 32767 is written into the position to be set and 17344 is written into the position which the threshold value 32767 previously had. For the reordering of the threshold values in the tonal value range from 50% to 100%, the procedure is carried out a similar way, a start again being made from the binary data field having the area coverage 50%, a search being made with the low-pass filters for a position with the minimum filtered result, the neighborhood conditions of FIG. 20B applying, the positions found in the binary data field being set to black and the threshold values from (MX×MY/2) to (MX×MY−1) being reset in ascending order. This concludes the first working phase 20 (FIG. 2) of the method according to the invention, the generation of the basic screen.

Figure 21:
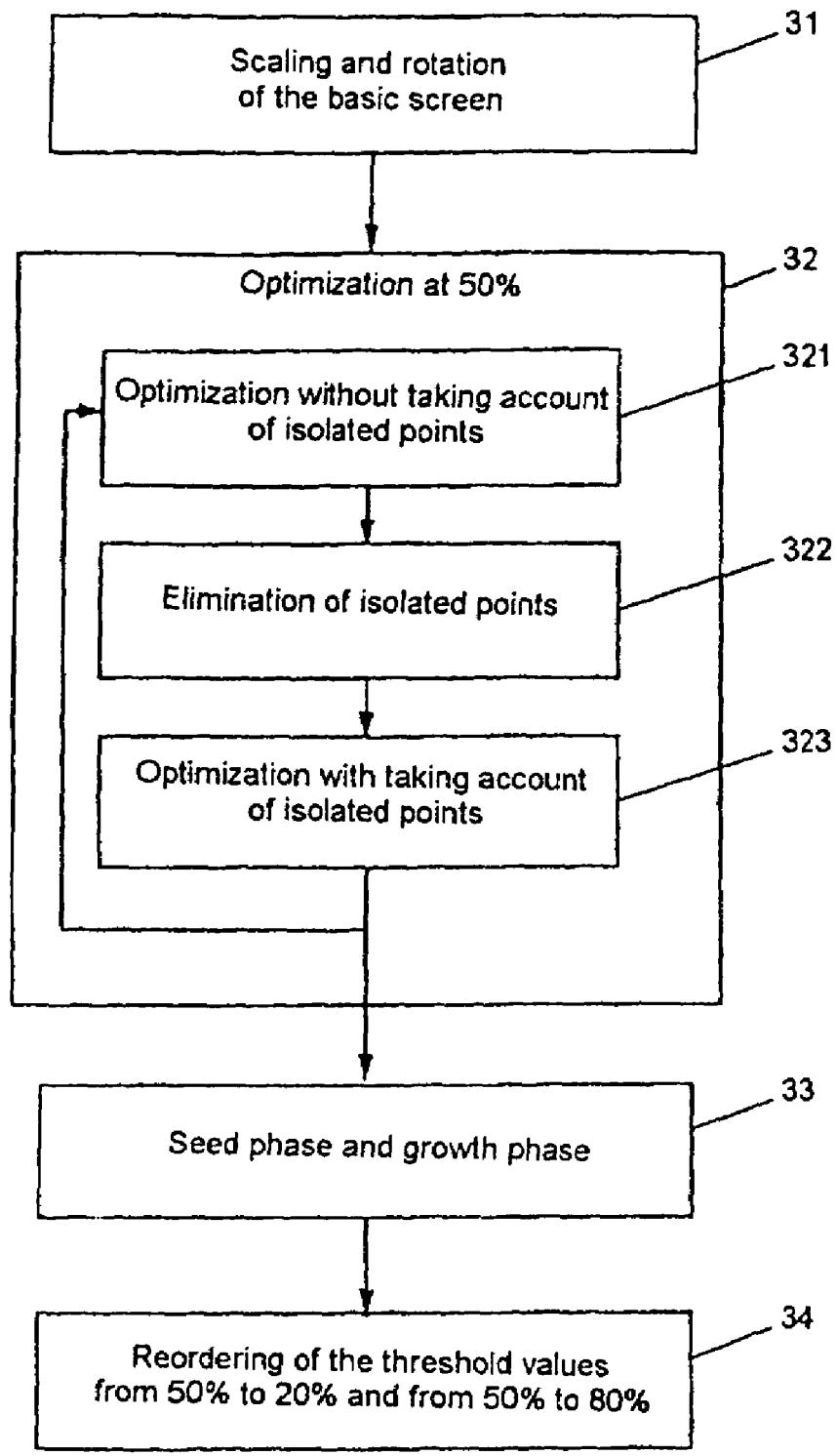
FIG. 21 is an illustration showing the working steps for producing threshold value matrices for the printing inks.

Starting from the basic screen, in the second working phase 30 (FIG. 2), threshold value matrices for the printing inks are derived, for example one threshold value matrix 3 in each case for the four printing inks CMYK. FIG. 21 shows the flow of the working steps in the working phase 30.

In the first working step 31, for each printing ink the threshold value matrix 3 of the basic screen having MX×MY threshold values is scaled to a different size having generally NX×NY threshold values and rotated by a different multiple of 90°. If the basic screen has 256×256 threshold values, for example scaled threshold value matrices of 253×253, 246× 246, 239×239 and 232×232 are generated for the four printing inks CMYK, and are additionally rotated with respect to the basic screen by 0°, 90°, 180° and 270°. If printing is carried out with more than four printing inks, then the further scaled threshold value matrices can additionally be mirrored. The scaling is carried out in accordance with one of the known methods for scale changing, the threshold value matrix 3 being treated as a gray value image whose dimensions are to be changed. In general, these methods calculate the values of the scaled matrix by a two-dimensional interpolation filter, for example with a Bessel filter. During the application of the interpolation filter, the property of the threshold value matrix 3 to fold over must be noted, as was explained by using FIG. 9. Following the scaling, the available NX×NY threshold values are assigned to the positions of the scaled threshold value matrix 3 in ascending order of the interpolated values. The different scaling and rotation of the threshold value matrices 3 for the printing inks is necessary in order to avoid disruptive patterns that occur periodically when the printing inks are printed together. The scaling also achieves a situation in which the structures at 50% area coverage have different widths in the threshold value matrices for the printing inks, which likewise contributes to avoiding disruptive patterns in the combined print.

In the following working step 32, the bit patterns which generate the scaled threshold value matrices 3 at 50% area coverage are optimized again in order to generate round structures and to eliminate isolated points. The algorithms of the working steps 321, 322, 323 applied for this purpose, which can also be run through cyclically many times, coincide with the working steps 231, 232, 233 (FIG. 3) which have already been explained for the optimization 23 of the basic screen.

As a result of the optimization 32, the threshold values for the tonal value ranges from 0% to 50% and from 50% to 100% are no longer distributed optimally. There therefore follow a new seed phase and growth phase 33, which in principle will proceed in the same way as the seed phase 21 and the growth phase 22 during the generation of the basic screen (FIG. 3). In order that the bit pattern optimized for the 50% area coverage is not changed, however, the additional secondary condition that black seed points and growth points are placed only where there are already black points in the bit pattern of the 50% area coverage is complied with. In a corresponding way, white seed points and growth points are placed only where there are already white points in the bit pattern of the 50% area coverage. Black and white seed points can also be configured differently with respect to their size and their spacing conditions. For instance, depending on the printing process, black seed points of size 2×2 in a white environment can still be printed satisfactorily, while white seed points of this size in a black environment are often already smeared, so that it may be better to combine the black seed points of size 2×2 with white seed points of size 3×3.

In the last working step 34, the threshold values for the tonal values from 50% to 20% and from 50% to 80% are reassigned once more, the algorithm which has already been explained for working step 24 (FIG. 3) during the generation of the basic screen being applied. Therefore, above all, the number of isolated points still present is reduced. This is limited to the tonal value range between 20% and 80% in order to maintain the size and shape of the seed points of 2×2 or 3×3 points. For applications in which the seed points must also be only as small as one exposure point, the optimization step 33 can be omitted and working step 34 can be carried out for the entire tonal value ranges from 50% to 0% and 50% to 100%. Following the conclusion of working step 34, a threshold value matrix 3 is available for each printing ink and can be used for half-toning the color separation data of this printing ink.

According to the invention, the quality of the threshold value matrices 3 generated for the basic screen and for the printing inks is analyzed in order to check the result achieved and, if appropriate, to carry out further optimization steps or to execute the entire generation process again with changed parameters. A quality analysis is preferably carried out after the conclusion of working phases 20 and 30 (FIG. 2) but can also be carried out in order to assess intermediate results. The first quality criterion is the homogeneity with which black and white points are distributed in the half-toned bit patterns of the various tonal values. In order to analyze the homogeneity, the half-toned bit patterns for the tonal values in the range from 0% to 100% are generated from the threshold value matrices 3 in small steps, for example in steps of 0.5%, by comparing the threshold values with the tonal value. Two-dimensional low-pass filters of different width are applied to the half-toned bit patterns, preferably filters having a Gaussian course and filter widths of, for example, 17, 27, 35, 63, 127, 255, and the minimum filtered value and the maximum filtered value are determined. The difference between the two values is the criterion describing the quality. This difference should be as small as possible for all the tonal values.

Figure 22:
FIGS. 22A-22C are illustrations showing the point configurations for the analysis of the isolated points.
Figure 22:
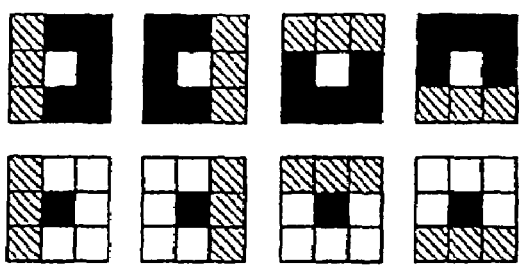
Figure 22:
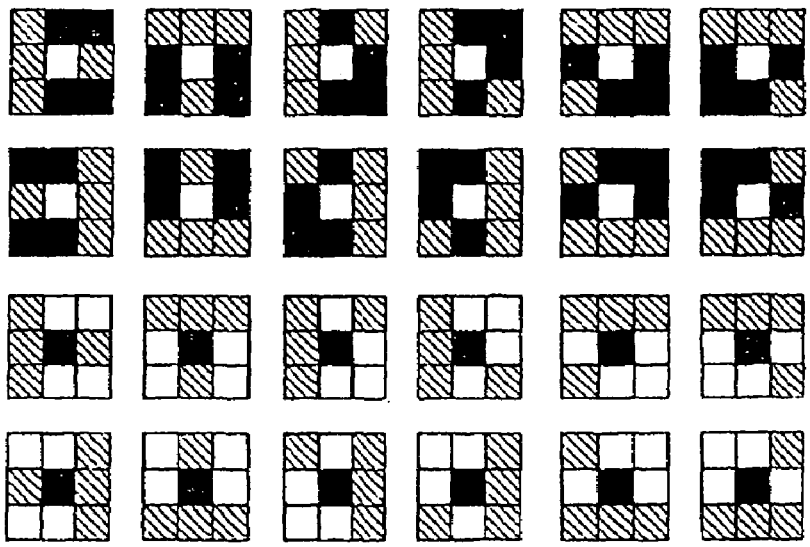

A further quality criterion is the number of remaining isolated points in the half-tone bit patterns of the tonal value steps. In order to determine a measure of quality, the half-toned bit patterns are examined for the occurrence of specific point configurations, which are provided with a different weight in groups. FIG. 22A shows the point configuration having the highest weight 3 for a white and a black point, respectively, at the center. The hatched fields are not examined. FIG. 22B shows the point configurations having the weight 2 for a white and a black central point, respectively. Finally, FIG. 22C shows the third group of point configurations having the weight 1. The weights of the point configurations found are added up and the sum is the measure of quality for the isolated points of the relevant half-toned bit pattern. This sum should be as small as possible. Finally, as an overall measure of quality, a weighted sum of a plurality of filtered differences and the sum of the weight of the remaining isolated points can be formed.

This application claims the priority, under 35 U.S.C. § 119, of German patent application No. 10 2004 057 461.8, filed Nov. 29, 2004; the entire disclosure of the prior application is herewith incorporated by reference.

We claims:

1. A method for generating a threshold value matrix for a basic screen for frequency-modulated half-toning for generating a half-toned form of image data, which comprises the steps of:

varying the image data in a total value range between 0% and 100%;

forming the threshold value matrix to contain MX×MY threshold values and being filled with the threshold values from 0 to (MX×MY−1);

determining values of image points of the half-toned form by performing a comparison between tonal values of the image data and the threshold values of the threshold value matrix;

placing black points alternately in a first binary data field having MX×MY binary points;

placing white points in a second binary data field having MX×MY binary points;

determining first positions with at least two low-pass filters of different width applied to the first binary data field and to the second binary data field respectively;

at the first positions or in an environment of the first positions, performing a search for specific part patterns of the black or white points and second positions are determined there, at which the black and white points are respectively placed; and at the second positions of the black points, entering the threshold values from 0 to ((MX×MY)/2−1) in the threshold value matrix in ascending order and at the second positions of the white points, entering the threshold values from (MX×MY−1) to ((MX×MY)/2) in the threshold value matrix in descending order.

2. The method according to claim 1, which further comprises generating further threshold value matrices for printing inks by performing a combination of scaling and/or rotation and/or mirroring of the threshold value matrix of the basic screen.

3. The method according to claim 2, which further comprises setting rotation amounts to a multiple of 90°.

4. The method according to claim 1, which further comprises optimizing the threshold value matrix by the further steps of:

in a binary data field having a bit pattern of the black and white points produced when the threshold values are compared with a predefined tonal value, using at least two low-pass filters of different widths, which are applied to the binary data field, for determining a position of a maximum filtered value and a position of a minimum filtered value;

at the position of the maximum filtered value and the minimum filtered value or in an environment of these positions, performing a search for specific part patterns of the black and white points and modified positions of the maximum filtered value and the minimum filtered value are determined there;

interchanging, at the modified positions in the binary data field, the black and white points; and interchanging, at the modified positions in the threshold value matrix, the threshold values.

5. The method according to claim 4, wherein as a result of the interchanging of the black and white points, part patterns having pointed and angular structures are converted into part patterns having round structures.

6. The method according to claim 1, which further comprising optimizing the threshold value matrix by the further steps of:

in a binary data field having a bit pattern of black and white points produced when the threshold values are compared with a predefined tonal value, performing a search for specific part patterns of the black and white points and determining the positions of the part patterns;

interchanging, at the positions found in the binary data field, the black and white points; and interchanging, at the positions found in the threshold value matrix, the threshold values.

7. The method according to claim 6, wherein as a result of the interchanging of the black and white points, isolated points are eliminated.

8. The method according to claim 1, which further comprises assessing a quality of the threshold value matrix by the further steps of:

in binary data fields having bit patterns of the black and white points produced when the threshold values are compared with different tonal values, determining a maximum filtered value and a minimum filtered value by using at least one low-pass filter; and using a difference between the maximum filtered value and the minimum filtered value as a measure of the quality.

9. The method according to claim 1, which further comprises assessing a quality of a threshold value matrix by the further steps of:

in binary data fields having bit patterns of the black and white points produced when the threshold values are compared with different tonal values, performing a search for specific part patterns, to which weights are assigned in groups; and using a sum of the weights of the part patterns as a measure of the quality.

* * * * *